(12) United States Patent
Hargett, Jr.

(10) Patent No.: US 8,480,981 B2
(45) Date of Patent: Jul. 9, 2013

(54) CONTROLLED PRESSURE RELEASE VESSEL FOR MICROWAVE ASSISTED CHEMISTRY

(75) Inventor: Wyatt Price Hargett, Jr., Matthews, NC (US)

(73) Assignee: CEM Corporation, Matthews, NC (US)

( * ) Notice: Subject to any disclaimer, the term of this patent is extended or adjusted under 35 U.S.C. 154(b) by 0 days.

(21) Appl. No.: 13/205,045

(22) Filed: Aug. 8, 2011

(65) Prior Publication Data

US 2011/0293491 A1 Dec. 1, 2011

Related U.S. Application Data

(62) Division of application No. 10/249,011, filed on Mar. 10, 2003, now abandoned.

(51) Int. Cl.
*B01J 3/03* (2006.01)
(52) U.S. Cl.
USPC .......... 422/550; 215/260; 215/270; 215/271; 215/310
(58) Field of Classification Search
USPC .................................. 215/260, 270, 271, 310
See application file for complete search history.

(56) References Cited

U.S. PATENT DOCUMENTS

| | | |
|---|---|---|
| 2,929,687 A | 3/1960 | Buchoff |
| 4,055,396 A | 10/1977 | Meyer et al. |
| 4,083,756 A * | 4/1978 | Tajkowski ............ 205/204 |
| 4,210,255 A * | 7/1980 | Pan ............ 220/203.15 |
| 4,228,914 A | 10/1980 | Sanderson |
| 4,287,154 A | 9/1981 | Sommers |
| 4,672,996 A | 6/1987 | Floyd et al. |
| 4,799,598 A * | 1/1989 | McFadyen ............ 215/260 |
| 4,830,217 A | 5/1989 | Dufresne et al. |
| 4,877,624 A | 10/1989 | Floyd et al. |
| 4,882,128 A | 11/1989 | Hukvari et al. |
| 4,904,450 A | 2/1990 | Floyd |
| 4,933,529 A | 6/1990 | Saville |
| 5,061,263 A | 10/1991 | Yamazaki et al. |
| 5,182,236 A | 1/1993 | Caldwell et al. |
| 5,207,247 A | 5/1993 | Hood |
| 5,224,515 A | 7/1993 | Foster et al. |
| 5,230,865 A | 7/1993 | Hargett et al. |
| 5,246,434 A | 9/1993 | Ebara |
| 5,264,185 A | 11/1993 | Floyd |

(Continued)

FOREIGN PATENT DOCUMENTS

| | | |
|---|---|---|
| DE | G93 09 355.1 U1 | 11/1994 |
| DE | 43 25 667 A1 | 2/1995 |
| JP | 1274382 A | 11/1989 |

*Primary Examiner* — In Suk Bullock
*Assistant Examiner* — Paul Hyun
(74) *Attorney, Agent, or Firm* — Summa, Additon & Ashe, P.A.

(57) ABSTRACT

A controlled release and self-resealing pressure-maintaining lid for reaction vessels in microwave assisted chemistry is disclosed. The lid includes a rigid perimeter, a rigid center load-bearing portion, and a flexible portion connecting the rigid perimeter to the center load-bearing portion so that the center portion can move when said flexing portion flexes. The lid can be used in conjunction with a vessel assembly. The vessel assembly can include a microwave-transparent, heat expandable reaction vessel having at least two cylindrical portions axially adjacent one another with one of the portions having a diameter larger than the diameter of the other portion, a transition portion between the two cylindrical portions, a vessel mouth in the larger-diameter portion, and a cylindrical retaining sleeve around the vessel.

3 Claims, 7 Drawing Sheets

U.S. PATENT DOCUMENTS

| | | |
|---|---|---|
| 5,382,414 A | 1/1995 | Lautenschlager |
| 5,427,741 A | 6/1995 | Bennett |
| 5,520,886 A | 5/1996 | Bennett et al. |
| 5,858,178 A | 1/1999 | Lautenschlager |
| 5,948,307 A | 9/1999 | Stalling |
| 5,981,924 A | 11/1999 | Lautenschlager |
| 6,011,247 A | 1/2000 | Grillo et al. |
| 6,136,276 A | 10/2000 | Hargett, Jr. et al. |
| 6,287,526 B1 | 9/2001 | Hargett, Jr. |
| 2001/0022949 A1 | 9/2001 | Hargett, Jr. |
| 2002/0061372 A1 | 5/2002 | Hargett, Jr. et al. |

\* cited by examiner

CONTROLLED PRESSURE RELEASE VESSEL FOR MICROWAVE ASSISTED CHEMISTRY

RELATED APPLICATIONS

This is a divisional of Ser. No. 10/249,011 filed Mar. 10, 2003.

BACKGROUND

The present invention relates to microwave assisted chemistry, and in particular relates to a reaction vessel structure that can both withstand and release high pressures without catastrophic failure.

Microwave assisted chemistry refers to the use of microwaves to initiate or accelerate chemical reactions. Microwave assisted chemistry is particularly useful in adding energy to materials that are responsive to microwave radiation because under most circumstances, the resulting effects take place much more rapidly than they would if the reactions were initiated or accelerated using more conventional techniques such as convection or conduction heating.

As well understood by those familiar with the electromagnetic spectrum, the term "microwave" is often used generically to refer to radiation with wavelengths of between about 1000 and 500,000 microns ($\mu$), and corresponding frequencies of between about $1 \times 10^9$ and $5 \times 10^{11}$ Hertz (Hz). These are arbitrary boundaries, however, and other sources refer to microwaves as having frequencies of between about 108 Hz and 1012 Hz and wavelengths of between about 300 centimeters (cm) and 0.3 millimeters (mm). For commercial and consumer purposes in the United States, the available microwave frequencies are regulated by the Federal Communications Commission and are generally limited to certain frequencies such as 2450 megahertz (MHz). Because of the relatively long wavelength of microwave radiation, microwave assisted chemistry techniques are often carried out in closed vessels which are in turn placed inside a device that bears a superficial relation to a consumer microwave oven, but that is much more sophisticated in its source, waveguide, cavity, and control elements.

Microwave assisted chemistry can be used in a variety of chemical processes including moisture determination, ashing, digestion, extraction, and synthesis. Under some circumstances, these various techniques are preferably or necessarily carried out in closed vessels which, because of the generation or expansion of gases inside, must be able to withstand pressures significantly above atmospheric pressure.

Accordingly, a number of pressure vessels have been developed for high-pressure microwave assisted chemistry. Such vessels are typically formed of microwave transparent materials that offer the structural capabilities required to withstand such high pressures. High-strength polymers are exemplary of such materials and offer the required microwave transparency and resistance to chemical attack. Such materials tend to be brittle, however, so that failure under pressure tends to destroy the vessel quickly and release its contents suddenly. In order to complement these polymers and avoid catastrophic failure, the vessel or certain of its component parts typically include one or more composite materials, a common version of which includes textile materials such as fibers, yarns or fabrics.

Versions of such composite fabric vessels are disclosed, for example, in U.S. Pat. Nos. 5,427,741; 5,520,886 and 6,136, 276, and published U.S. applications Nos. 20010022949 and 20020061372, all of which are commonly assigned with the present invention.

The composite sleeve structures have provided the opportunity to greatly increase the reaction pressures at which microwave assisted chemistry can be carried out, while avoiding some of the disadvantages of earlier generations of reaction vessels. In particular, the enhanced performance and controlled, non-shattering failure characteristics of composite vessels have permitted microwave assisted chemistry to be carried out at pressures as high as 800 pounds per square inch (psi) in the reaction vessel. As set forth in the cited patents, higher pressures can be accommodated to a certain extent by surrounding the reaction vessel with both the composite sleeve and a frame which holds the vessel in place and which urges the vessel lid or cap tightly against the reaction vessel.

There are, however, a number of reactions that can be carried out under elevated, but more moderate pressures. In particular, for carrying out certain types of reactions at temperatures of between about 200 and 250° C., a vessel should be able to withstand pressures of about 250 pounds per square inch (psi). Furthermore, many reactions can continue to take place successfully if the excess pressure can be temporarily relieved.

Vessels that safely release higher pressures are generally well understood, e.g. commonly assigned U.S. Pat. No. 5,230,865, but many provide for a one-time failure, i.e. the vessel releases pressure safely, but at the cost of the vessel or a component part. Furthermore, the pressure release tends to be total rather than controlled.

As another consideration, vessels for high-pressure microwave-assisted chemistry techniques have tended to be somewhat bulky for reasons that include the pressure requirements set forth above. As a complimenting feature, the microwave instruments used to heat reactions in these vessels generally need to be of a manageable size (footprint) in order to fit into expected areas of a laboratory. As a result, the maximum number of vessels that can be heated at one time in a typical microwave instrument tends to be between 12 and 16. In many common instruments, such as those illustrated in U.S. Pat. No. 5,230,865, the pressure-resistant vessels are arranged on a turntable so that they can be rotated through the cavity as the microwaves are applied. Such rotation helps provide an even amount of radiation to each vessel in accordance with the behavior of microwaves in such cavities.

Of course, the respective sizes of the vessels and microwave cavities fixes the number of reactions that can be carried out at any one time. This is becoming more limiting as chemistry has moved, with the aid of increasingly available and affordable computational power, to reaction schemes in which larger numbers of very similar, but not identical, reactions are carried out concurrently rather than consecutively. Accordingly, a need exists for smaller vessels that can be used in larger numbers in typical microwave instruments, but which still can withstand the required pressures, and which still can offer the desired capabilities for temporary, partial pressure release followed by resealing without permanent vessel damage or distortion.

As another problem, vessels of this type typically must be machine tightened (i.e. with a wrench-like torque force) in order to withstand the expected pressures. A need thus also exists for vessels that can be hand-tightened—thus eliminating extra steps, tools and time—while still providing the desired pressure-resistance and release capacities.

SUMMARY OF THE INVENTION

In one aspect, the invention is a controlled release and self-resealing vessel assembly for high pressure, microwave assisted chemistry. In this aspect, the invention comprises as a cylindrical reaction vessel formed of a material that is substantially transparent to microwave radiation. The vessel has angular walls, one closed end for retaining reactants in the lower portions of the vessel, and one open end that defines a mouth for the vessel. The mouth of the cylinder vessel has a lip that is beveled inwardly from the open end. A microwave-transparent solid floating plug closes the mouth of the reaction vessel, with the plug have a frustum portion for engaging the beveled lip when the plug is placed in the mouth of the vessel. A flexible clamp exerts a defined axial force against the plug for sealing the plug in the open end of the cylinder with the frustum engaging the lip.

In another aspect, the invention is a controlled pressure-maintaining and releasing lid for reaction vessels in microwave-assisted chemistry. In this aspect, the lid comprises a rigid perimeter, a rigid center load-bearing portion, and a flexible portion connecting the rigid perimeter to the center load-bearing portion so that the center portion can move when the flexing portion flexes.

In another aspect, the invention is a controlled pressure release and self-resealing vessel assembly for high-pressure microwave-assisted chemistry that comprises a microwave transparent heat expandable reaction vessel that has at least two cylindrical portions axially adjacent one another. One of the portions has a diameter larger than the diameter of the other portion. A transition portion is between the two cylindrical portions with the mouth of the vessel being in the larger diameter portion. A cylindrical retaining sleeve surrounds the vessel and defines an annular space between the smaller diameter portion and the sleeve.

The foregoing and other objects and advantages of the invention and the manner in which the same are accomplished will become clearer based on the followed detailed description taken in conjunction with the accompanying drawings.

DETAILED DESCRIPTION

Figure 1:
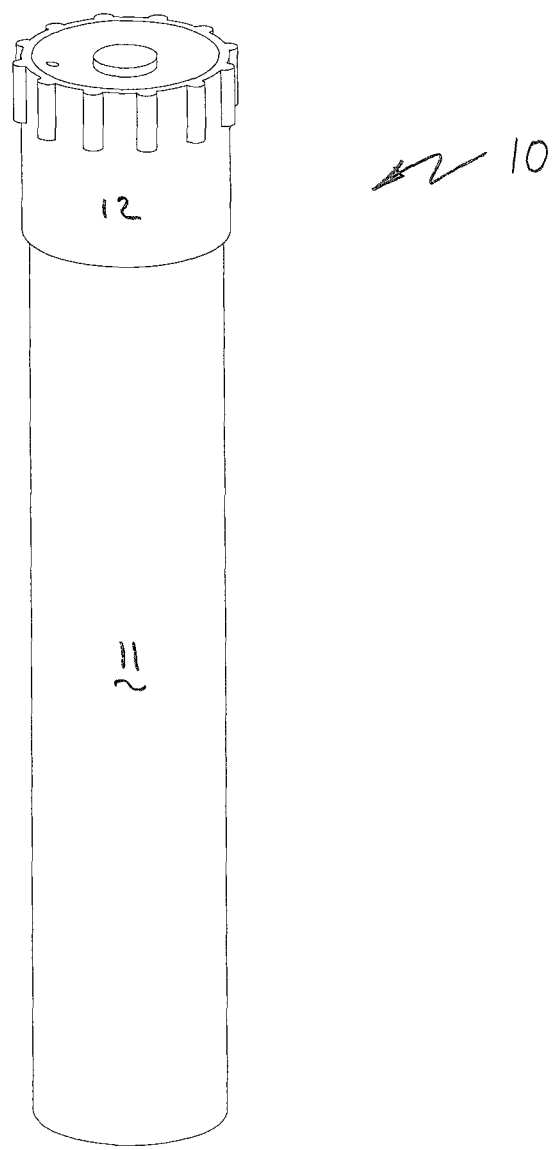
FIG. 1 is a perspective view of a vessel assembly according to the present invention.

FIG. 1 is a perspective view of a controlled-release and self-resealing vessel assembly for high pressure microwave assisted chemistry according to the present invention. The overall vessel assembly is broadly designated at 10 in FIG. 1. The vessel assembly includes a cylindrical reaction vessel 11 formed of a material that is substantially transparent to microwave radiation. In the embodiment illustrated in FIG. 1, the vessel assembly includes a lid 12 that covers the mouth of the vessel, as will be described with respect to later figures.

Figure 2:
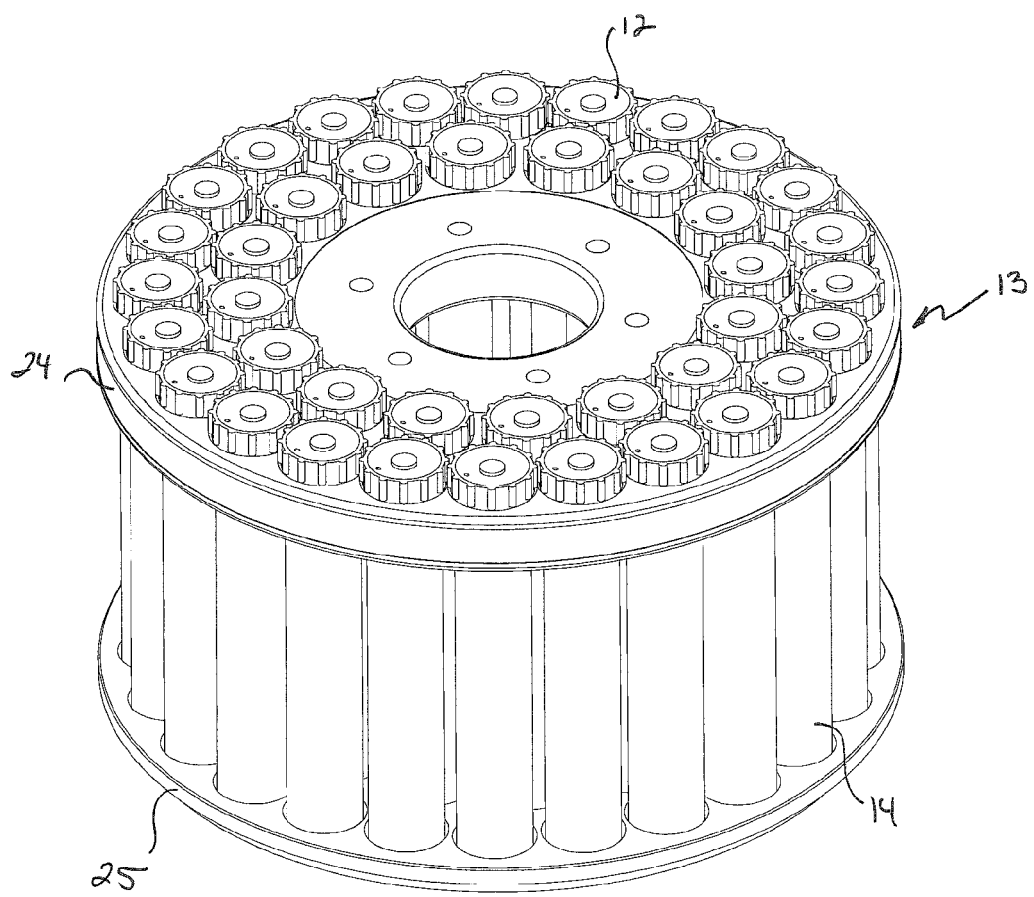
FIG. 2 is a perspective view of a turntable-style rack for carrying a plurality of the vessels illustrated in FIG. 1.

FIG. 2 is a perspective view of a plurality of vessels 10 in a rack, broadly designated at 13, and shown in the form of a carousel or turntable that holds up to 40 of the vessels 10. FIG. 2 illustrates the lids 12 of the vessels, along with a retaining sleeve 14 that surrounds each vessel in a manner to be described with respect other of the figures. The vessel portion 11 from FIG. 1 is inside of the sleeves 14 illustrated in FIG. 2.

Figure 3:
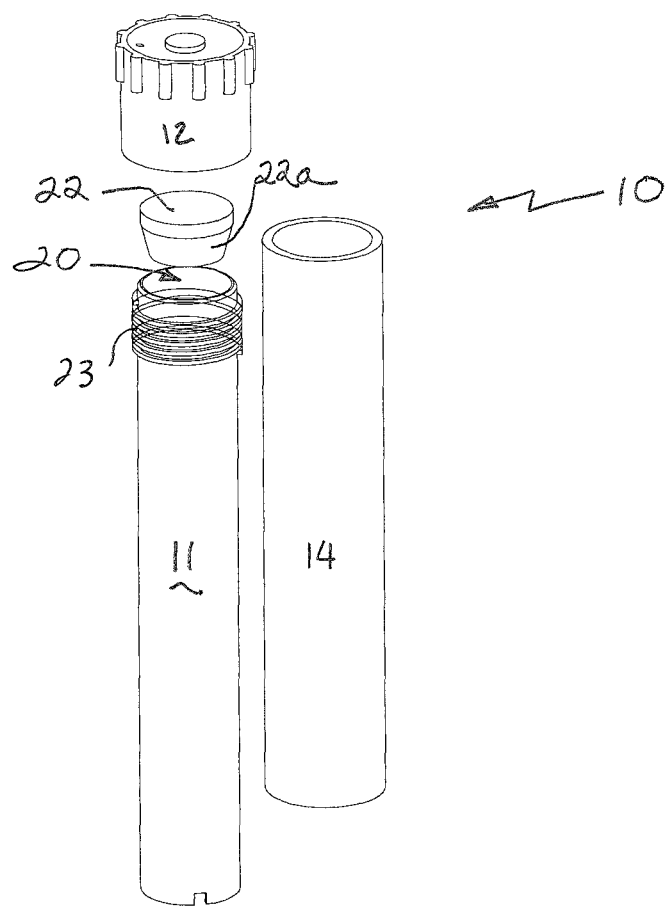
FIG. 3 is an exploded view of the vessel illustrated in FIG. 1.
Figure 4:
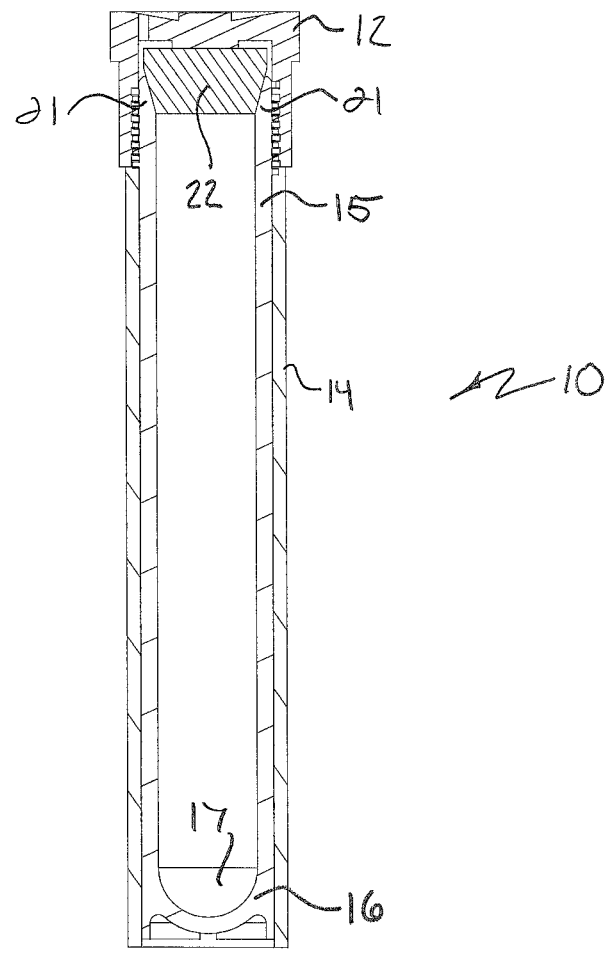
FIG. 4 is a cross-sectional view of the vessel illustrated in FIG. 1.

FIGS. 3 and 4 illustrate additional details about the vessel assembly 10. FIG. 3 is an exploded perspective view of the vessel 10 and FIG. 4 is a cross sectional view of the vessel 10. As first illustrated in FIG. 4, the reaction vessel 10 has annular walls 15, one closed end generally illustrated at 16 for retaining reactants 17 in the lower portions of the vessel 10 and one open-end 20 that defines a mouth for the vessel 10. The term "reactants" is used herein in its broadest sense to include chemical compositions that can react with one another, along with appropriate solvents, catalysts, or any other materials or compositions useful or necessary in carrying out a particular chemical reaction under the influence of microwave radiation.

Figure 6:
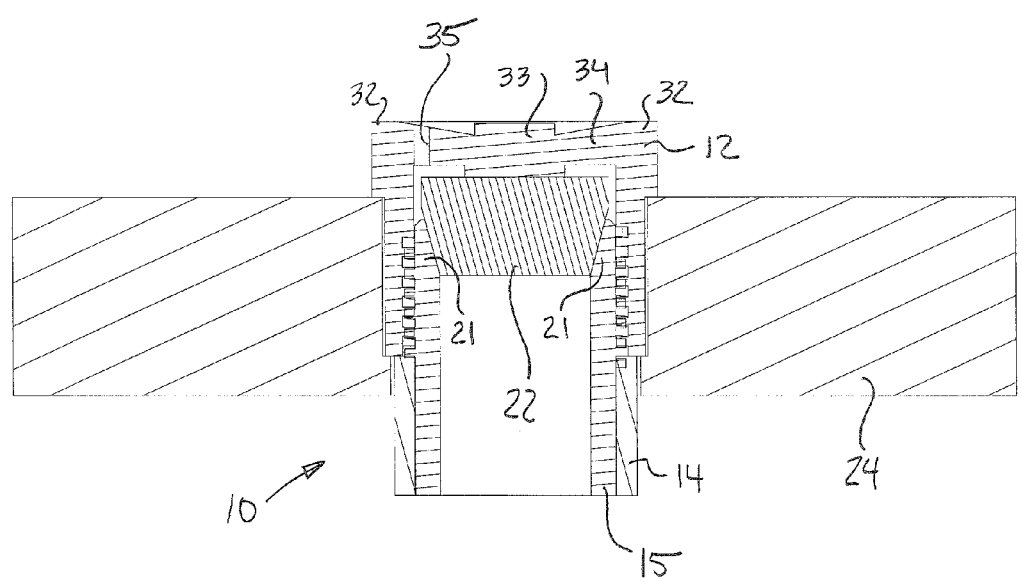
FIG. 6 is an enlarged cross-sectional view of the top portions of the vessel of FIG. 1 including portions of the turntable.

The mouth 20 of the cylinder 11 has a lip 21, illustrated best in FIGS. 4 and 6, that is beveled inwardly from the open end. In this embodiment, the vessel assembly 10 includes a microwave transparent solid floating plug 22 for closing the mouth 20 of the vessel 11. The plug 22 has a frustum portion 22A that engages the beveled lip 21 when the plug 22 is placed in the mouth 20 of the vessel 11. A flexible clamp, illustrated in FIGS. 3, 4 and 6 has a threaded lid 12 and the threaded outer wall 23 of the reaction vessel 11, exerts a defined axial force against the plug 22 for sealing the plug 22 in the mouth 20 of the vessel 11 with the frustum portion 22A engaging the beveled lip 21 and thus urging the plug 22 into the mouth 20 of the vessel 11.

As used herein the plug is defined as "floating" to describe its lack of any mechanical interaction or mechanical advantage with any other single part. The plug is described as "solid" to physically and functionally distinguish it from structures such as that illustrated in commonly-assigned published U.S. application No. 20010022949.

Furthermore, although terms such as "cylinder" and "annular" are used herein, it will be understood that in some (but not necessarily all) circumstances, a polygonal cross section can serve the same purpose as a cylinder.

In preferred embodiments, the vessel 11, the plug 22 and the lid 12 are all formed of polymer compositions, more preferably the same polymer, and most preferably a fluoropolymer such as polytetrafluoroethylene and its various related compounds. The use of fluoropolymers and their manufacture into vessels and component parts according to the present invention is well understood and need not be detailed herein. Any polymer composition is suitable, however, provided that it is sufficiently transparent to microwave radiation to allow the radiation to penetrate to the desired or necessary extent into the vessel, can withstand attack by the chemicals of expected use, and can be manufactured into structures that can withstand the desired pressures. It will thus be understood that the polymer can be selected based upon the expected use of the vessel (pressure, temperature, contents) and need not be identical for all purposes. Other appropriate materials for such vessels can include structural polyolefins, polycarbonates, polyamides and polyimide compositions. Such a list is, of course, exemplary rather than limiting.

As perhaps best illustrated in FIGS. 3, 4, and 6, the lip 21 is beveled inwardly at an angle between about 20 and 40 degrees from the vertical for maximizing the radial force exerted by the plug 22 against the vessel 11 when the cap 12 is secured on the vessel 11 and the vessel 11 and plug 22 expand upon heating. The use of the beveled structure still, nevertheless, provides the opportunity for pressure release. In most preferred embodiments, the lip is beveled inwardly at an angle of between about 10 and 20 degrees and the frustum has an angle similar or identical to that of the lip to engage the lip securely. Angles that are similar, but not identical will also provide an appropriate seal under many circumstances because they can exert an additional wedging action between the plug 22 and the lip 21.

FIGS. 3 and 4 also illustrate the rigid sleeve 14 that surrounds the vessel 11 for limiting the radial expansion of the vessel 11 when the vessel 11 is heated or under pressure or both. In preferred embodiments, the sleeve is formed of an engineering polymer or an appropriate composite material; e.g. filter-reinforced polymer.

Figure 5:
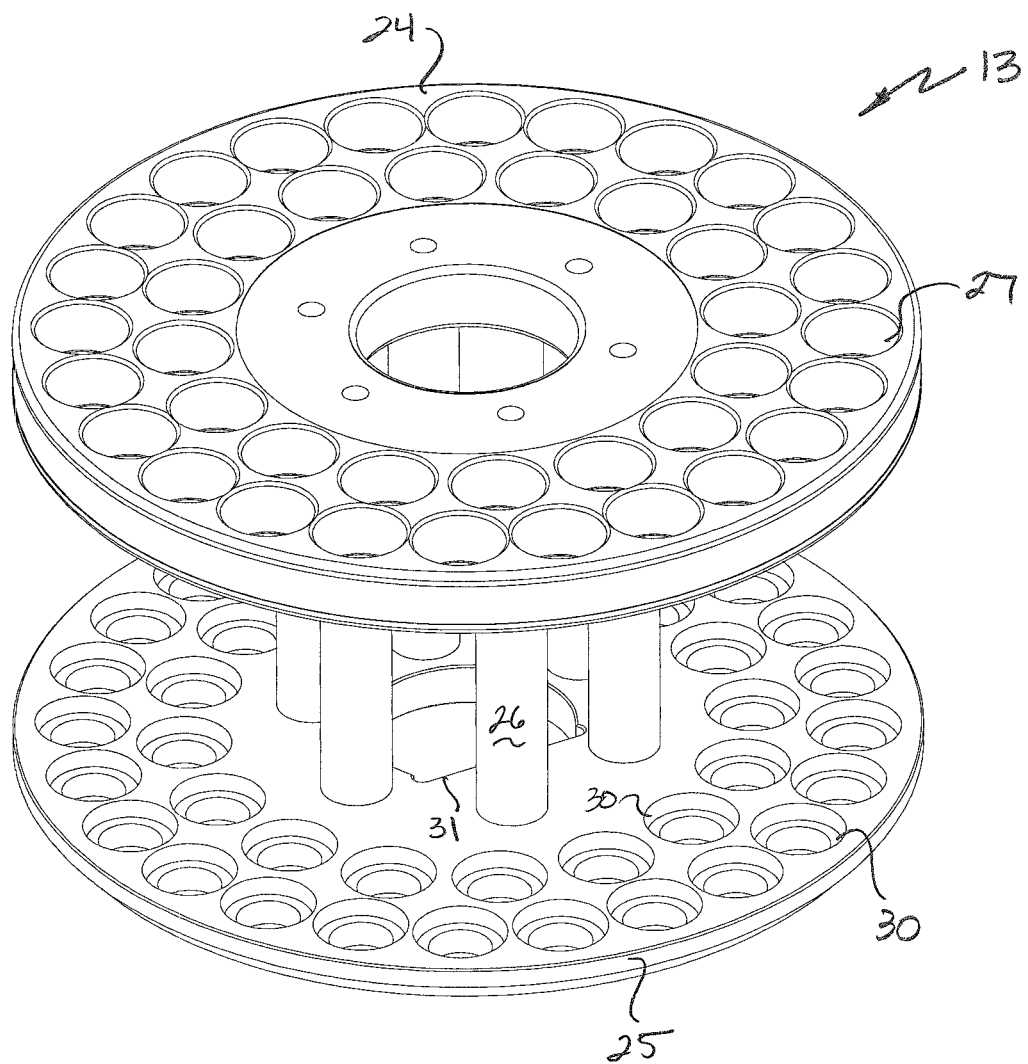
FIG. 5 is a view of the turntable of FIG. 2, but without the vessels therein.

FIG. 5 illustrates a preferred embodiment of the rack 13 for holding the vessels 10 in a microwave cavity (not shown). The rack has a diameter of about 15 inches in preferred embodiments and will fit in most conventional-sized microwave instruments that are designed for corresponding vessels of earlier generations. The rack 13 holds at least one, and more preferably a plurality of vessels 10 in an upright position inside a microwave cavity. In the embodiment illustrated in FIG. 5, the rack 13 includes a circular upper plate 24 and a corresponding circular lower plate 25, spaced apart from one another by a series of supports 26. The plates 24 and 25 each carry a set of openings 27 in the upper plate 24 and 30 in the lower plate 25. Each respective opening 27 is vertically aligned with a corresponding opening 30 so that together they will support a vessel assembly 10 vertically in the turntable 13. The bottom plate 25 also includes an opening 31 for engaging a turntable motor or drive in the microwave instrument. As is known to those familiar with the operation of microwave instrumentation, in larger microwave cavities, the propagation of energy is such that various modes will form and reform as the reactions progress and the load changes. Accordingly, one method of applying microwaves in an even manner is to rotate the reaction vessels 10, within the cavity as the microwave radiation is being applied. The turntable 13 illustrated in FIG. 5 meets this purpose, but it will be understood that the invention is neither dependent upon nor limited to the rotation of vessels in the cavity. In a typical instrument, the vessels rotate in the rack about an axis defined by the center of the rack and rather than individually about their own axes.

The rack 13 preferably exposes lower portions of the reaction vessels 11 through the openings 30. This permits external temperature monitoring of the vessels using an infrared sensor positioned beneath the vessels 10, typically at or below the floor of a microwave cavity. In the embodiment illustrated in FIG. 5, two infrared sensors (not shown) are used, one located along the circumference defined by the outermost set of holes 30 and one along the circumference defined by the inner set of holes 30. As the rack 13 rotates, each vessel 10 will in turn pass over one of the infrared sensors (not shown) from which its temperature can be monitored on a periodic basis equivalent to the rotation cycle of the turntable 13.

One of the advantages of the present reaction vessel structure is its smaller diameter, and thus, in preferred embodiments, the rack 13 will carry at least 20 pairs of openings 27, 30 for carrying at least 20 of the vessels 10. In the more preferred embodiments, and as illustrated in FIG. 2, the rack 13 can carry 40 or more of the vessels 10. Perhaps most importantly, the rack 13 can hold these vessels within the same footprint as conventional rack and vessel systems that typically hold 10, 12 or at most 16 such vessels.

Figure 9:
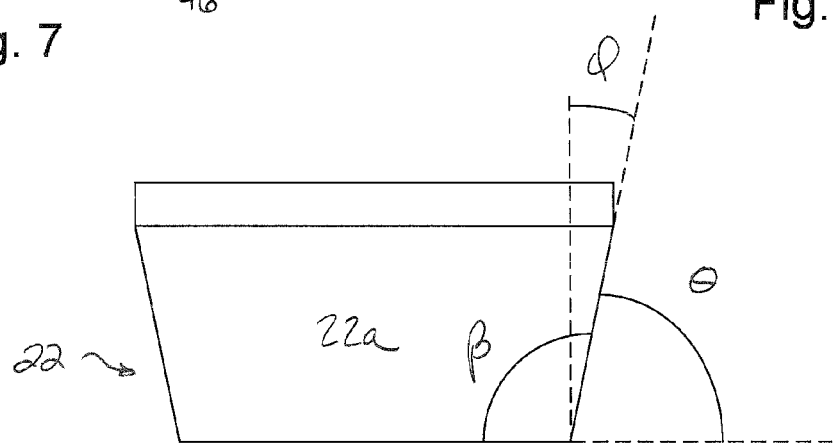
FIG. 9 is a cross-sectional view of the vessel plug according to the present invention.

FIGS. 6 and 9 illustrate additional details of the invention, including those details that enable the smaller-diameter, hand-tightened vessel of the invention to successfully hold and release pressure. FIG. 6 is an enlarged cross sectional view similar to that of FIG. 4, but additionally illustrating portions of the top plate 24 of the rack 13. As illustrated in FIG. 6, the rack 13 and its upper plate 24 immediately surround the lid 12 and other portions of the vessel 10 to limit radial expansion of the vessel 10 at the lid. As stated previously, one functional purpose of the vessel is to maintain a predetermined pressured generated by reactions and gases inside the vessel 10, then release excess pressure, and then reseal itself at a lower—but still elevated—pressure. A number of the elements described herein cooperate in carrying this out. First, it will be understood that the main forces acting on the vessel during the application of microwave radiation are heat (generated in most circumstances by the reactants or the action of the microwaves upon them) and pressure (generated by both the reactions taking place and the elevated temperatures). Heat, standing alone, will encourage the vessel 10 and its component parts to expand. In the present invention, the beveled lip portions 21 and the frustum shaped plug 22 will expand against one another. Because of the angle of the beveled lip 21 and the frustum portion 22A of the plug 22, these elements will exert horizontal force against each other. Such force helps maintain the plug 22 and lip 21 in contact up to desired pressures. Additionally, because the plate 24 of the rack 13 bears against the exterior portions of the vessel 10 adjacent to the plug 22 and the beveled lip 21, the plate 24 prevents the vessel 10 from radially expanding at this point. Accordingly, the force generated from heat expansion will tend to seat the plug 22 and the beveled lip 21 against one another to seal the vessel.

The construction of the lid 12, the vessel 10 and the plug 22 also cooperate to release pressure at a desired point. In this regard, the lid 12 is formed of a substantially rigid perimeter portion 32, a rigid center load-bearing portion 33, and a flexible portion 34 (i.e., more flexible than the perimeter 32 or the center 33) connecting the rigid perimeter 32 to the center load bearing portion 33 so that the center portion 33 can move when the flexing portion 34 flexes. As FIG. 6 illustrates, these elements are typically and preferably formed in conjunction with the cylindrical cap 12 with its set of interior threads for engaging the upper threaded portions 23 of the reaction vessel 11.

In use, axial pressure exerted against the plug 22 urges the plug 22 against the center load-bearing portion 33 of the lid 12. When the axial pressure against the plug 22 exceeds the flexing resistance of the flexible portion 34 of the lid 12, the flexible portion 34 flexes and allows the plug 22 to become unseated from the beveled lip 21. The lid 12 also includes at least one opening 35 in the flexible portion 34 for permitting gases to flow therethrough. Accordingly, when pressure inside the vessel 10 unseats the plug 22, and the lid 12 flexes in the manner just described, gases can escape from the interior past the plug 22 and through the opening 35. After the pressure inside the vessel 10 is sufficiently reduced, the spring and plastic memory of the flexible portion 34 will urge the center load-bearing portion 33 to again press the plug 22 back into engagement with the beveled lip 21 and thus reseal the vessel.

Furthermore, by avoiding a completely solid or full contact between the lid 12 and the plug 22, the invention provides a means for pressure and heat-expansion stresses to be relieved by the flexing action just described rather than by exerting forces against static parts until they fail.

FIG. 9 is an enlarged schematic cross sectional view of the plug 22. FIG. 9 illustrates that the angle of the beveled lip 21 or the equivalent angle of the frustum portion 22A of the plug 22, can be expressed in several alternative ways. First, the bevel can be expressed as the angle phi (φ) defined by the difference between the side of the frustum 22A and a line perpendicular to the top and bottom surfaces of the plug 22. Alternatively, the same angle can be expressed as theta (θ) in FIG. 9, which is the angle between the side of the frustum 22A and a line parallel to the bottom surface of the plug 22. Theta is thus an acute angle. Alternatively, the angle could be expressed as beta (β), which is the compliment of theta, with beta being the angle defined between the frustum wall of the plug 22 and the bottom surface of the plug 22. In preferred environments, phi is between about 20 and 40 degrees, with an angle of between about 10 and 20 degrees being most preferred. These are preferred for maintaining pressures of up to about 250 psi, with the corresponding temperatures in the vessel being between about 200 and 220° C. It will be understood, however, that if phi is a greater angle (and thus theta a smaller one), the exertion of force along the frustum and the lip 21 will still exist but with a smaller horizontal component, and thus the plug 22 will release at a lower pressure. Accordingly, the bevel 21 and the frustum 22 can be selected and designed for the desired pressure release point.

Figure 7:
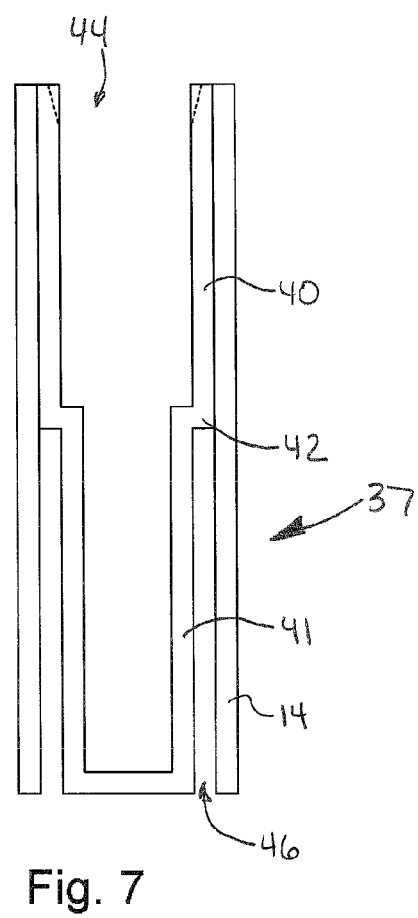
FIG. 7 is a schematic cross-sectional view of one embodiment of a vessel according to the present invention.
Figure 8:
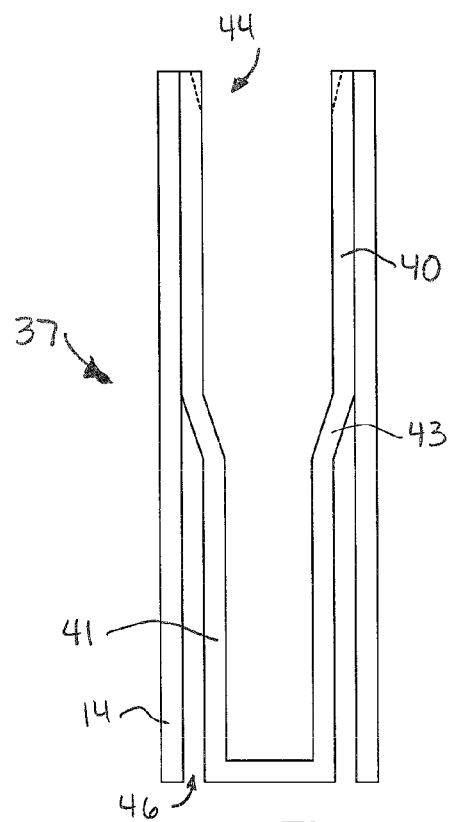
FIG. 8 is a schematic cross-sectional view of another embodiment of the vessel according to the present invention.

FIGS. 7 and 8 illustrate another aspect of the present invention. As with the other embodiments, the invention comprises a self-sealing and controlled release vessel assembly for high-pressure microwave-assisted chemistry. In this embodiment, the vessel assembly includes a microwave transparent heat expandable reaction vessel broadly designated at 37 in FIGS. 7 and 8. The vessel 37 is formed of at least two cylindrical portions 40 and 41 axially adjacent one another with one of the portions having a diameter larger than the diameter of the other portion. In FIGS. 7 and 8, portion 40 is illustrated as larger than portion 41. A transition portion, 42 in FIGS. 7 and 43 in FIG. 8, connects the two cylindrical portions 40 and 41. The vessel 37 includes a mouth 44 in the larger diameter portion 40. The same cylindrical retaining sleeve 14 illustrated and referred to in other of the drawings surrounds the vessel 37 and thus defines an annular space between the smaller diameter portion 41 and the sleeve 14. In preferred embodiments, the larger diameter portion is defined by an outer diameter approximately equal to the inner diameter of the sleeve 14 and the smaller diameter portion 41 as defined by an outer diameter smaller than the inner diameter of the sleeve to create the annular space. As illustrated in FIG. 7, the transition portion can be stepped or (as in FIG. 8) beveled.

It will be understood that the size differences between the respective diameters are schematically illustrated and greatly exaggerated in FIGS. 7 and 8. In actual practice, the differences are less visibly evident.

In operation the stepped and two-diameter vessel 37 will expand into the annular space 46 earlier than elsewhere. Accordingly, when the vessel 37 is urged to expand under the influence of heat or pressure or both, the bottom portion 41 tends to expand into the available space 46. In conventional prior vessels, the retaining sleeve typically immediately surrounds the entire vessel which has the effect of urging the vessel to expand upwardly and downwardly (axially) and thus distort the vessel in an undesired manner. The design of the present invention in this embodiment avoids this problem.

The embodiment illustrated in FIGS. 7 and 8 can be used in conjunction with all of the other features described herein, including the floating plug and the lid with its flexible portion.

In the drawings and specification there has been set forth a preferred embodiment of the invention, and although specific terms have been employed, they are used in a generic and descriptive sense only and not for purposes of limitation, the scope of the invention being defined in the claims.

The invention claimed is:

1. A controlled pressure maintaining and releasing reaction vessel for microwave assisted chemistry, said reaction vessel comprising:
   a cylinder with one end defining a mouth and one end closed to hold reactants;
   a set of exterior threads on said vessel adjacent said mouth;
   a threaded lid on said mouth of said cylinder, said lid comprising interior threads, a rigid perimeter, a rigid center load-bearing portion, and an annular flexible portion connecting said rigid perimeter to said center load-bearing portion so that the center portion can move when said flexing portion flexes; and
   a floating plug in said mouth and in contact with said center load-bearing portion of said lid when said lid is threaded onto said vessel.

2. A vessel according to claim 1 comprising at least one opening in said flexible portion of said lid for permitting gases to flow therethrough.

3. A vessel according to claim 1 wherein said lid comprises a fluorocarbon polymer.

* * * * *